United States Patent Office 2,725,395
Patented Nov. 29, 1955

2,725,395

OXYALKYLATED FATTY AMINE SALTS OF TRIFLUOROACETIC ACID

Allan E. Chester, Highland Park, Ill., assignor to Poor & Company, Chicago, Ill., a corporation of Delaware No Drawing. Application December 21, 1951,
Serial No. 262,898

3 Claims. (Cl. 260—501)

This invention relates to new and useful organic compounds and more particularly to reaction products of trifluoroacetic acid and oxyalkylated fatty amines and to a method for the preparation thereof.

One of the objects of the invention is to produce new and useful complex organic compounds which are soluble and stable in acid solutions.

Another object of the invention is to produce new and useful reaction products of oxyalkylated fatty amines and trifluoroacetic acid.

A more specific object of the present invention is the preparation of new and useful compounds which possess foaming power in strong acid solutions such as chromic acid solutions containing sulfuric acid.

Another object of the invention is the preparation of new and useful acid stable, water soluble compounds which when employed as additives in chromic acid electroplating baths provide greater throwing power for the chromium.

A further object of the invention is the provision of a new and improved method for preparing compounds of the type referred to above. Other objects will appear hereinafter.

In accordance with the invention it has been found that new and useful products are obtained by reacting trifluoroacetic acid with oxyalkylated fatty amines. The preferred products are acid soluble and are especially suitable for use as foaming agents in acidic aqueous solutions. A copending application, Serial No. 262,899, filed of even date herewith, now Pat. No. 2,655,471, describes chromic acid electroplating baths containing products prepared in accordance with the present invention. It will be understood, however, that the products may be employed for many other purposes.

The invention will be further illustrated but is not limited by the following example in which the quantities are stated in parts by weight unless otherwise indicated.

Example

A product was prepared by adding trifluoroacetic acid to a soybean amine oxyethylated with approximately 10 moles of ethylene oxide, containing 20 carbon atoms in its alkyl chain and having an average molecular weight of 714. The addition of the trifluoroacetic acid was continued until the pH of the reaction mixture was approximately 7. The addition was made initially at room temperature (about 75° F.) and a moderate rise in temperature occurred during the neutralization. The resultant product is a cationic wetting agent which is unusually stable in acid solutions.

The addition of 1 quarter to 1 milliliter of this product per gallon of a chromic acid plating bath containing 33 ounces to 52 ounces of $CrO_3$ per gallon and sulfuric acid in any ratio of $H_2SO_4:CrO_3$ within the range of 1:100 to 1:60 provides greater throwing power for the chromium and also retards the chromic acid fumes. Especially good results are obtained by employing approximately ½ milliliter of the trifluoroacetic acid salt of the oxyethylated amine per gallon of chromic acid plating bath.

Other reaction products of oxyalkylated fatty amines and trifluoroacetic acid may be prepared by substituting equivalent quantities of other amines for the oxyethylated soybean amine.

The fatty amines are amines derived from fatty acids and normally contain 8 to 36 carbon atoms but may contain as high as 60 carbon atoms. They differ from each other in the number of carbon atoms in their alkyl groups, in the degree of saturation of the alkyl groups and in the number of alkyl groups attached to the amino nitrogen. Examples of fatty amines are those derived from soya beans, those derived from coconut oil and those derived from tallow. The oxyalkylation of these amines to produce oxyalkylated amines is effected by reacting the amines with an alkylene oxide, for example, ethylene oxide, 1,2-propylene oxide, or mixtures of ethylene oxide and 1,2-propylene oxide. The number of moles of the alkylene oxide is preferably at least 4 moles per mole of primary fatty amine, and for the purpose of the present invention the preferred products contain around 10 to 20 moles of alkylene oxide per mole of primary fatty amine. The fatty amines per se are water insoluble but oxyalkylation results in the addition of ether and hydroxy solubilizing groups to the molecule increasing the degree of water solubility and decreasing the cationic strength of the resultant material.

It will be understood that the trifluoroacetic acid salts of the oxyalkylated fatty amines can also be employed in other acidic aqueous liquids, for example, acid pickling solutions containing 6 to 20% sulfuric acid or 10 to 15% hydrochloric acid.

In preparing these salts it is generally preferable to employ approximately 1 mole of the trifluoroacetic acid for each amine group present in the oxyalkylated fatty amines.

Since many compounds are unstable in aqueous acid solutions, especially strong chromic acid solutions, and the compounds of the present invention are exceedingly stable, the invention supplies a need which has long been recognized in the art. Additionally, when these compounds are employed in chromic acid baths they increase the throwing power of such baths and provide a foam blanket which retards the chromic acid fumes.

The invention is hereby claimed as follows:

1. Salts of trifluoroacetic acid and oxyalkylated fatty amines containing in their molecules at least 4 oxyalkylene groups from the class consisting of oxyethylene groups and oxypropylene groups and in the aliphatic chains of the fatty amine 8 to 60 carbon atoms, said salts exhibiting cationic activity and being stable in acid solutions.

2. A trifluoroacetic acid salt of an oxyethylated fatty amine containing 10 to 20 oxyethylene groups per molecule and having in its alkyl group 8 to 36 carbon atoms.

3. A trifluoroacetic acid salt of an oxyethylated soybean amine oxyethylated with approximately 10 moles of ethylene oxide and containing approximately 20 carbon atoms in its alkyl chain.

References Cited in the file of this patent

UNITED STATES PATENTS

| | | |
|---|---|---|
| 2,174,762 | Schuett et al. | Oct. 3, 1939 |
| 2,355,337 | Spence | Aug. 8, 1944 |
| 2,396,076 | Benning et al. | Mar. 5, 1946 |
| 2,485,564 | Chester | Oct. 25, 1949 |
| 2,510,063 | Bried | June 6, 1950 |
| 2,541,678 | Swaney | Feb. 13, 1951 |
| 2,554,972 | Alquist et al. | May 29, 1951 |